United States Patent [19]
Akada et al.

[11] Patent Number: 6,011,599
[45] Date of Patent: Jan. 4, 2000

[54] INTEGRATED TYPE OF INFORMATION RECORDING MEDIUM USING PATTERNING ELECTRODES, AND ITS PACKAGING CASE

[75] Inventors: Masanori Akada; Hironori Kamiyama; Yuudai Yamashita, all of Tokyo, Japan

[73] Assignee: Dai Nippon Printing Co., Ltd., Tokyo, Japan

[21] Appl. No.: 08/744,929

[22] Filed: Nov. 6, 1996

[30] Foreign Application Priority Data

Nov. 6, 1995 [JP] Japan ..................................... 7-287284
Apr. 11, 1996 [JP] Japan ..................................... 8-089169

[51] Int. Cl.[7] .............................. G02F 1/13; G02F 1/1345

[52] U.S. Cl. ............................... 349/2; 349/149; 349/150; 349/152

[58] Field of Search ..................................... 349/2, 25, 27, 349/139, 149, 150, 152; 369/99, 100, 120, 273, 280

[56] References Cited

U.S. PATENT DOCUMENTS 4,881,110  11/1989  Braatz et al. ................................ 349/2
5,646,927  7/1997   Shimizu et al. ........................... 369/99

*Primary Examiner*—Minh Loan Tran
*Attorney, Agent, or Firm*—Sughrue, Mion, Zinn, Macpeak & Seas, PLLC

[57] ABSTRACT

According to the invention wherein leading electrodes of the respective electrode layers of an integrated type of information recording medium are bundled up on the same side, and a flexible printed board having electrodes corresponding to the respective leading electrodes and a interconnecting pattern printed thereon is superposed on the integrated type of information recording medium to lead electrodes out thereof, and wherein an integrated type of information recording medium is encased in a case formed by an upper lid provided with an image exposure window, etc., and a lower lid, electrodes can be assuredly led out of the integrated type medium, and the integrated type medium can be protected and mass produced.

4 Claims, 17 Drawing Sheets

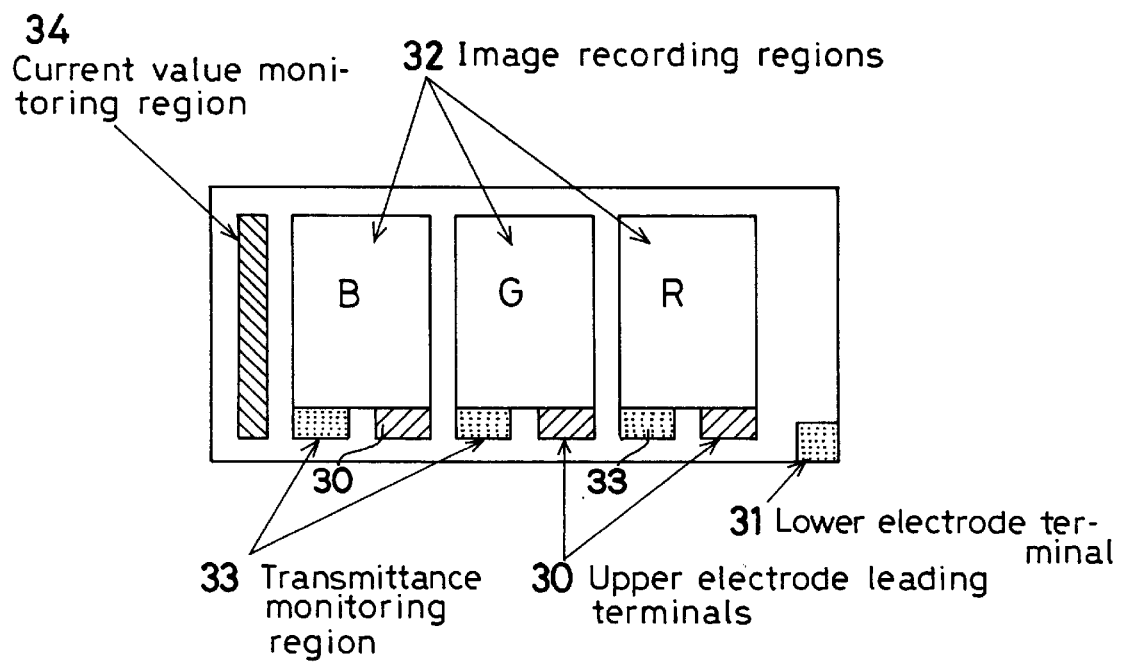
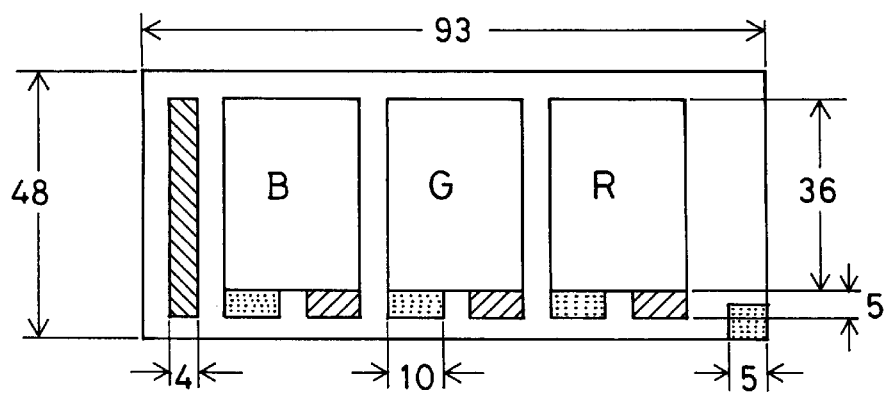

FIG. 7A
53 Windows    51 Upper lid
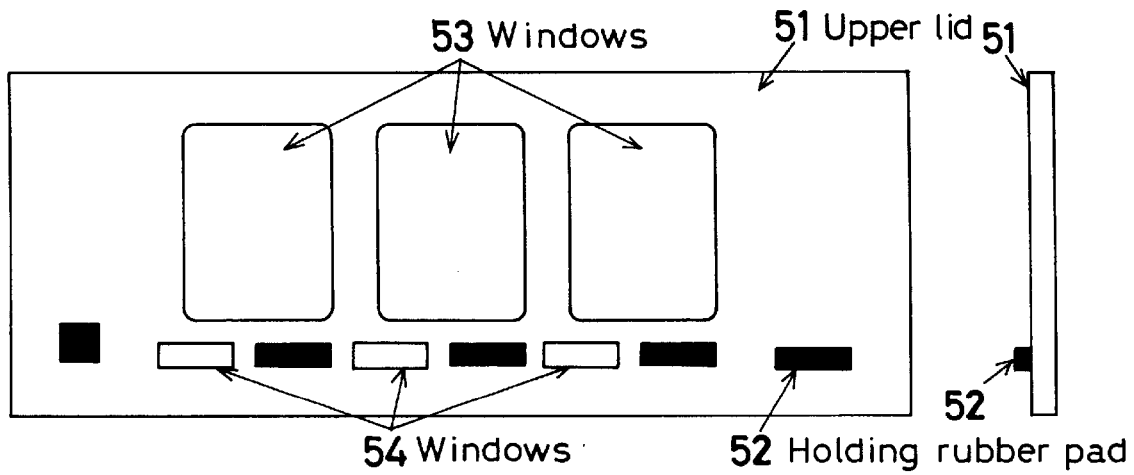
54 Windows    52 Holding rubber pad
FIG. 7D
51
52
FIG. 7B
55 Lower lid    56 Windows    57 Peripheral raised edges
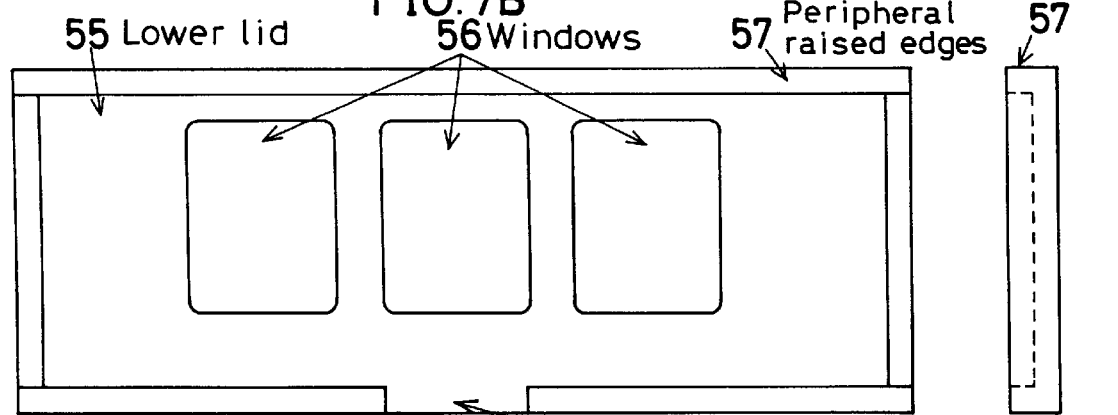
58 Electrode leading port
FIG. 7E
57
FIG. 7C
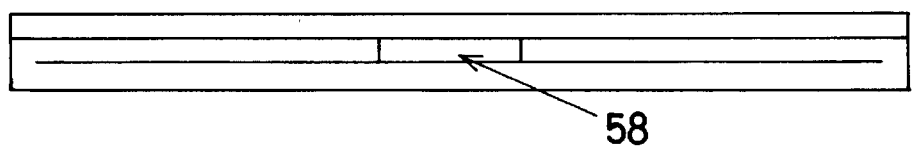
58

52 Electrode contact holding rubber

58 FPC leading port

INTEGRATED TYPE OF INFORMATION RECORDING MEDIUM USING PATTERNING ELECTRODES, AND ITS PACKAGING CASE

BACKGROUND OF THE INVENTION

The present invention relates to leading electrodes out of an integrated type of information recording medium comprising a stack of a photoelectric sensor and a liquid crystal recording medium, wherein the orientation of the liquid crystal recording medium is altered to record images, and a packaging case for an integrated type of information recording medium.

Among known liquid crystal recording media wherein a liquid crystal recording medium having a composite liquid crystal/polymer layer stacked on an electrode is integrally stacked on a photoelectric sensor provided with a photoconductive layer on an electrode layer, there is a type of recording medium designed to record images by exposure at an applied voltage.

Such an integrated type of information recording medium is shown in FIGS. 1A and 1B where reference numerals 10 and 20 represent a photoelectric sensor and a liquid crystal recording medium, respectively. The photoelectric sensor 10 includes a transparent electrode 12 and a photoconductive layer 13 stacked on a transparent support 11 in the described order, and the liquid crystal recording medium 20 includes a composite liquid crystal/polymer layer 23 stacked on a transparent electrode 22. For the photoconductive layer 13 use may be made of a single-structure layer such as an inorganic photoconductive layer, e.g., an amorphous selenium or silicon layer, or an organic photoconductive layer, e.g., a layer of polyvinyl carbazole and trinitrofluorenone added thereto. Use may also be made of a composite structure comprising a stack of a charge generation layer obtained by dispersing an azo type dye in resin such as polyvinyl butyral and a charge transport layer obtained by mixing a hydrazone derivative with resin such as polycarbonate. The integrated type of information recording medium is broken down into a direct stacked type wherein a liquid crystal recording medium is stacked directly on a photoelectric sensor as shown in FIG. 1A, a transmission type wherein a transparent dielectric material is used as an intermediate layer 24 as shown in FIG. 1B, and a reflection type wherein a dielectric mirror is used as the intermediate layer.

Upon such an integrated type of information recording medium irradiated with visible light acting as writing light while voltage is applied between the electrodes 12 and 22 via a power source 130, as shown in FIG. 2, the conductivity of the photoconductive layer 13 varies depending on the intensity of light, and the state of orientation of liquid crystal varies due to a change in the electric field applied on the composite liquid crystal/polymer layer 23. This state is maintained intact even upon removal of the electric field by putting the applied voltage off, so that imagewise information can be recorded.

Here, the liquid crystal recording medium and the photoelectric sensor are about 6 µm and about 10 µm in thickness, respectively, and so the integrated type of information recording medium has a very small total thickness less than 20 µm. Care must thus be taken of handling such a very thin medium; even slight impact often causes a glass failure or touching the medium directly with the hand has an adverse influence on image quality. Thus, electrodes have so far been led out of a very thin liquid crystal recording medium by pushing an elastic material against electrode contacts, for instance. However, much difficulty is involved in leading electrodes out of a thin and minute medium in an assured yet simple manner; for instance, such a medium cannot be used on a camera to pick up images readily. In addition, the number and structure of parts needed for leading electrodes become large and complicated, respectively, thus offering a problem in connection with mass production.

These problems may possibly be solved by handling an information recording medium while it is encased. In this case, however, it is desired to use a packaging case in which an information recording medium can be readily put and held without any misalignment, and which is structurally simple-enough for mass production.

One object of the present invention is to enable electrodes to be led out of an integrated type of information recording medium in an assured yet simple manner.

Another object of the present invention is to enable electrodes to be led out of an integrated type of information recording medium in an assured yet simple manner while protection is given thereto.

Yet another object of the present invention is to provide a packaging case for an integrated type of information recording medium, which can be mass produced.

Still yet another object of the present invention is to achieve easy encasing of an information recording medium without any misalignment, and ensure that electrodes are led out of the information recording medium.

SUMMARY OF THE INVENTION

The present invention is characterized in that leading electrodes of the respective electrode layers of an integrated type of information recording medium are bundled up on the same side, and a flexible printed board having electrodes corresponding to the respective leading electrodes and their interconnecting pattern printed thereon is superposed on the integrated type of information recording medium to lead electrodes out thereof.

The present invention is also characterized in that an upper lid provided with a window corresponding to an image region, an electrode holding rubber pad and a transmittance monitoring window, and a lower lid provided with an exposure window are fixed to each other with an integrated type of information recording medium sandwiched therebetween, and an electrode leading port is formed on a front side of a packaging case.

The present invention is further characterized in that an upper lid provided with one window to cover an image recording region and a transmittance monitoring region and a lower lid provided with one exposure window are fixed to each other with said integrated type of information recording medium sandwiched therebetween, and an electrode leading port is formed on a front or lateral side of a packaging case.

Still further, the present invention provides a case provided with an image exposure window in which an integrated type of information recording medium comprising a stack of a photoelectric sensor and a liquid crystal recording medium is put and held, characterized in that one of upper and lower lids forming said case is provided with a projection for fixing an electrode leading flexible printed board, and peripheral portions of said upper and lower lids to be engaged are each of a mating structure, and characterized in that a part of opposing peripheral surfaces of the upper and lower lids is provided with an ultrasonic fusing projection.

BRIEF DESCRIPTION OF THE DRAWINGS

FIGS. 3A and 3B illustrate an exemplary structure of the medium according to the present invention, FIGS. 7A–7E illustrate an exemplary packaging case.

DESCRIPTION OF THE PREFERRED EMBODIMENT

Figure 1A:
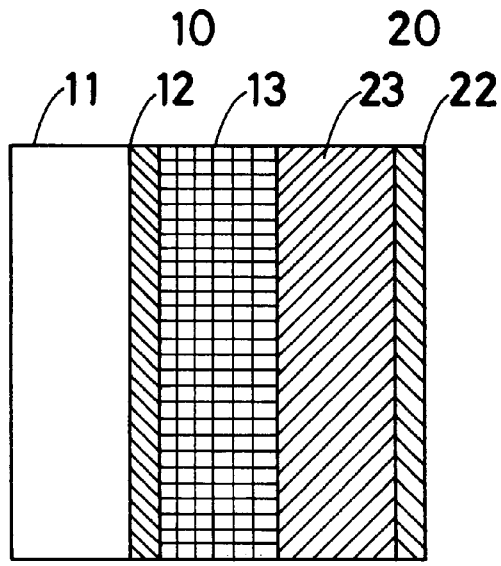
FIGS. 1A and 1B illustrate a conventional integrated type of liquid crystal recording medium.
Figure 1B:
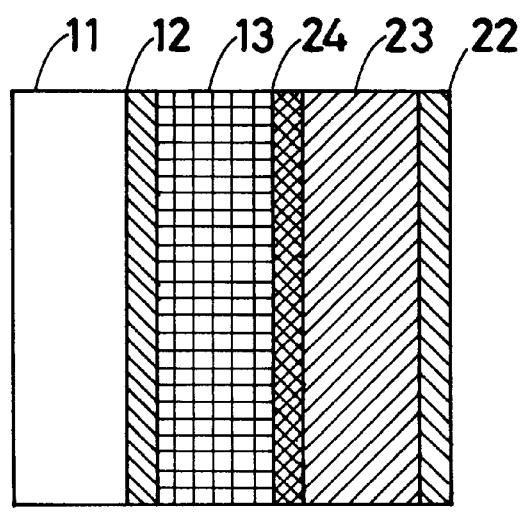
Figure 2:
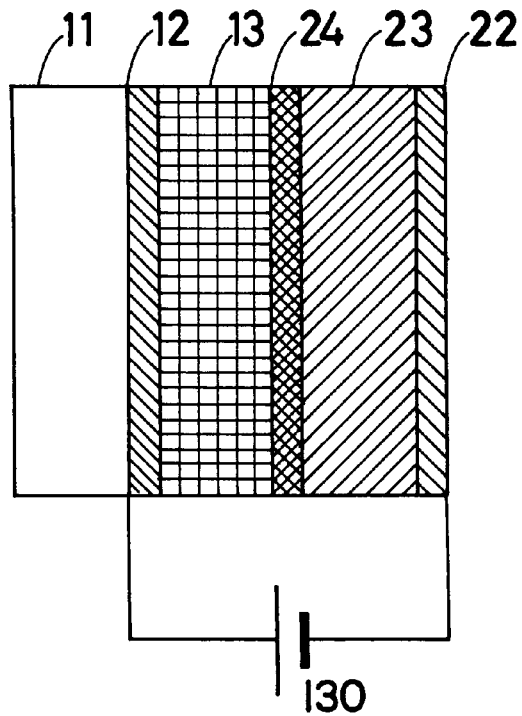
FIG. 2 is a schematic illustrating how to expose an image to light using the conventional integrated type of liquid crystal recording medium.

FIG. 3A–3B contain is plan schematics illustrating how electrodes are led out of an integrated type of recording medium according to the present invention. It is here to be noted that the recording medium used is much the same as explained with reference to FIGS. 1 and 2.

Referring to FIG. 3A, upper electrode leading terminals 30 are connected to R, G and B electrodes of a liquid crystal recording medium for instance, and a lower electrode terminal 31 is connected to an electrode of a photoelectric sensor, these opposing regions defining image recording regions 32. Transmittance monitoring regions 33 are leading electrode regions connected to the respective R, G and B electrodes to monitor the transmittance of dark portions. The recording medium is provided at one end with a current value monitoring region 34 to monitor a (dark) current through a dark portion. These upper electrode leading terminals 30, lower electrode terminal 31, transmittance monitoring regions 33 and current value monitoring region 34 are then positioned such that electrodes can be led out of the same side (as shown).

Referring to FIG. 3B, exemplary sizes of the respective regions of the integrated type of recording medium are illustrated. Given a 48 mm×93 mm medium, the widths of the regions on the electrode leading side are 4 mm for the current value monitoring region, 10 mm for both the transmittance monitoring regions and the upper electrode leading regions, and 5 mm for the lower electrode leading region.

Figure 4:
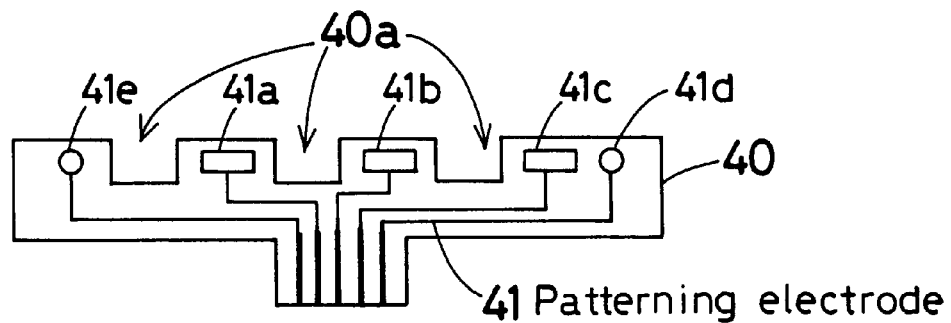
FIG. 4 is a schematic illustrating an exemplary patterning electrode according to the present invention.

FIG. 4 is a schematic showing a printed board for leading electrodes out of the respective regions shown in FIG. 3.

A flexible printed board 40 is printed thereon with a patterning electrode 41, and is provided with cutouts 40a corresponding to the three transmittance monitoring regions 33 (FIG. 3A), which define transmittance monitoring windows. Reference numerals 41a to 41c of the patterning electrode 41 represent contact portions connected to the upper electrode leading terminals 30 for R, G and B, 41d a contact portion connected to the lower electrode terminal 31, and 41e a contact portion connected to the current value monitoring region 34. It is here to be noted that the upper electrode leading terminals 30, because of being integral with the R, G and B electrodes, serve as the point of contact for terminals 41a to 41c.

FIGS. 5A–5D show enlarged schematics of a contact portion of the patterning electrode. As can be seen from FIGS. 5A and 5B, the contact portion is provided with several bump heads 42. As shown in section in FIG. 5C, each of the bump heads has been obtained by forming a through-hole in a 25-μm thick polyimide film substrate, and casting an electrode material through the hole to form an interconnecting pattern on the back side thereof. The bump head 42 comes into contact with the upper electrode of the medium, and has an interconnecting pattern printed on the back side, thereby preventing discharge between the medium and the contact portion.

Figure 5A:
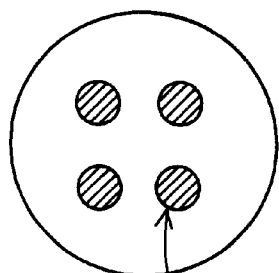
FIGS. 5A–5D illustrate electrode contacts on an enlarged scale.
Figure 5B:
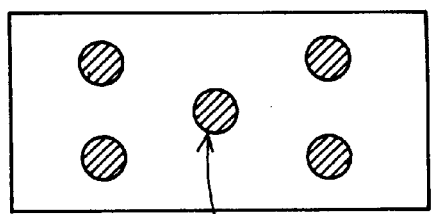
Figure 5C:
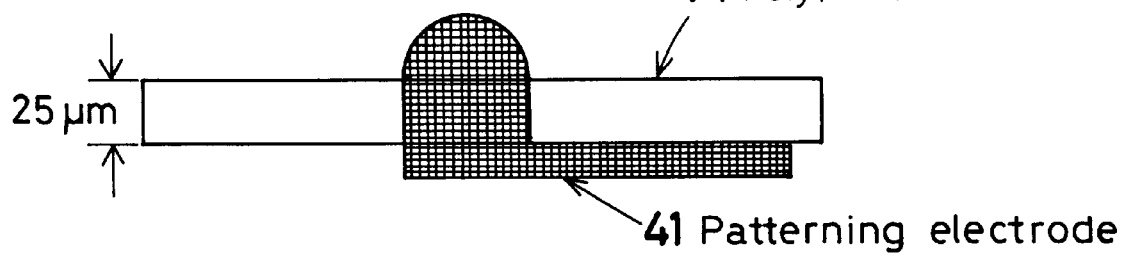
Figure 5D:
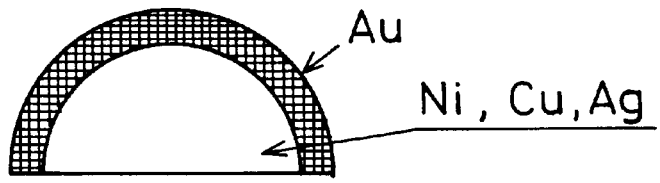

As can be seen from FIG. 5D or an enlarged schematic, the bump head 42 has been formed by the evaporation of Au on the surface of an alloy of Ni, Cu, and Ag, and is several μm to several tens μm in height.

Figure 6:
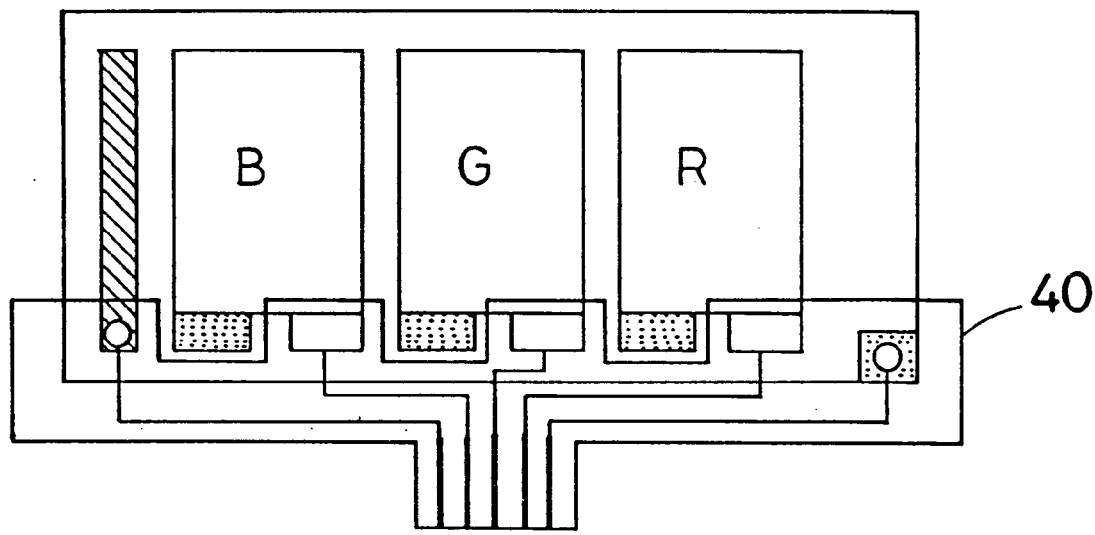
FIG. 6 is a schematic illustrating an exemplary connection of the patterning electrode to the medium.

FIG. 6 illustrates one exemplary connection of the patterning electrode to the leading electrodes of the integrated type medium.

The flexible printed board 40 with the patterning electrode formed thereon is superposed on the leading electrode regions of the integrated type medium with the bump heads turned upside down, and then the bump heads are connected to the respective leading electrodes of the medium. It is thus possible to lead electrodes out of a thin and minute medium in an assured yet simple manner and, hence, to make a great contribution to reductions in the number of parts, cost reductions, and mass-production.

One exemplary packaging case for leading electrodes out of an integrated type of information recording medium will then be explained.

FIGS. 7A–7E illustrate one embodiment of the packaging case according to the present invention; FIG. 7A illustrates an upper lid 51 (opposite to a liquid crystal medium) forming a part of a plastic packaging case 50 and FIG. 7B shows a lower lid 55 (opposite to a photoelectric sensor) forming a part of the packaging case 50). The upper lid 51 is provided with holding rubber pads 52 for making sure of such connections of leading electrodes of a medium to electrode contacts of a pattern electrode as shown in FIG. 6, windows 53 corresponding to R, G and B image formation regions, and transmittance monitoring windows 54. The lower lid 55 includes exposure windows 56 corresponding to the R, G and B image formation regions, and peripheral raised edges 57 ensuring a space enough to receive an integrated type medium, one of which edges is cut out to form an electrode leading port 58. The upper and lower lids 51 and 55 are fixed to each other by use of screws, ultrasonic bonding or other means while an integrated type medium 60 is sandwiched between them (see FIG. 7C). FIGS. 7D and 7E show side views of the packaging case components shown in FIGS. 7A and 7B, respectively. It is here to be understood that the peripheral raised edges may be formed on either the upper or the lower lid.

Figure 8:
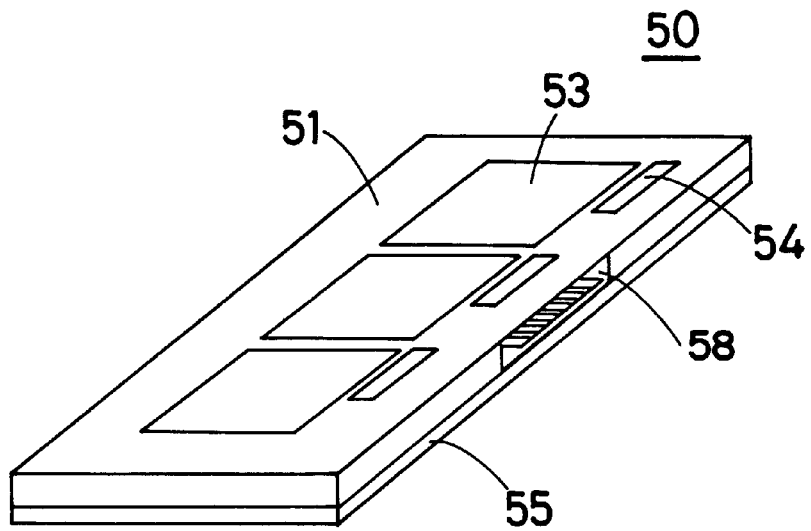
FIG. 8 is a perspective schematic of a packaging case having an FPC electrode leading port.

FIG. 8 is a perspective schematic of the packaging case 50 in which an upper lid 51 includes peripheral raised edges, windows 53 and transmittance monitoring windows 54, and a pattern electrode leading port 58 out of which interconnections are to be led, as shown. In this case, an image is exposed to light from below to record it in a recording medium.

Figure 9:
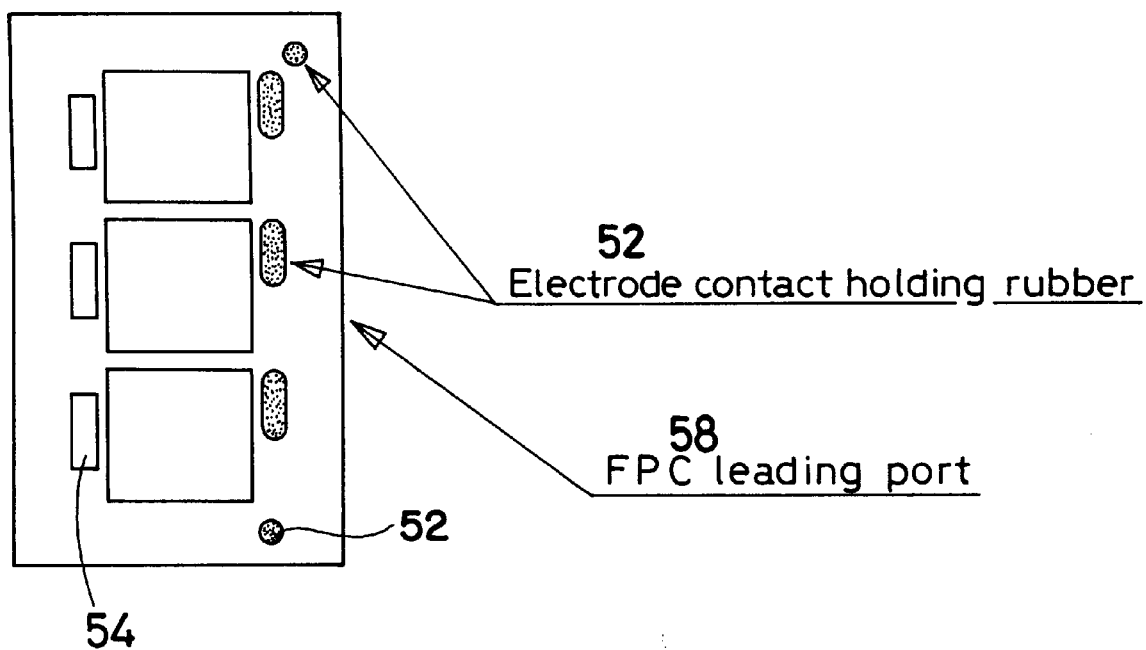
FIG. 9 is a schematic illustrating another embodiment of the upper lid of the packaging case.
Figure 10:
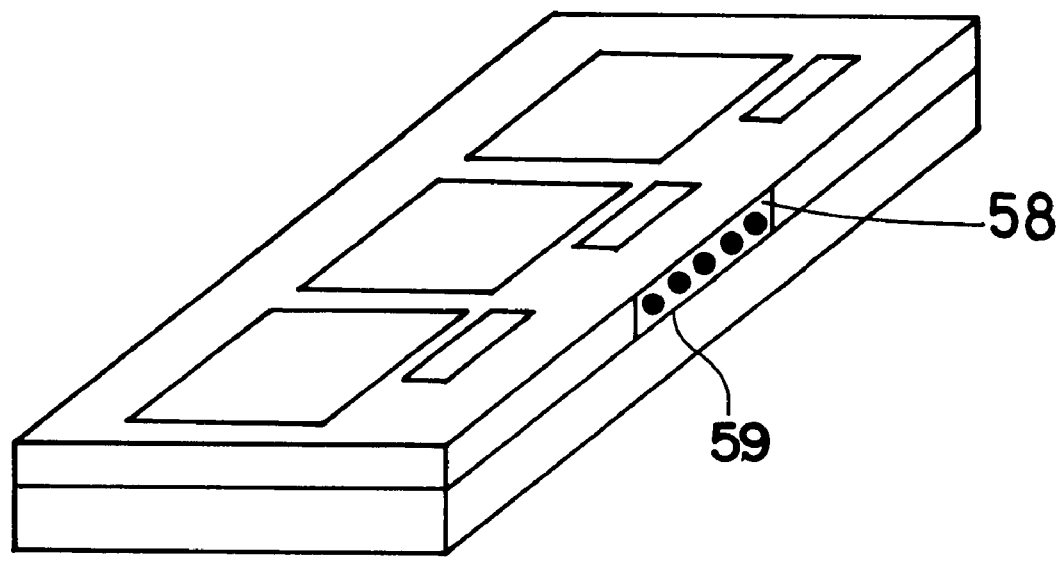
FIG. 10 is a schematic illustrating the packaging case provided with electrode contacts.

FIG. 9 illustrates another embodiment of the packaging case according to the present invention in which rubber pads for holding electrode contacts in place are opposed to transmittance monitoring windows with image formation regions sandwiched therebetween, as shown. FIG. 10 illustrates yet another embodiment of the packaging case which, as shown, has electrode contacts 59 formed within an electrode leading port 58. For power supply, only the insertion of a socket into that port is needed. This arrangement makes power supply very easy.

It is here to be noted that the integrated type of recording medium is sensitive to light. Preferably, therefore, the packaging case is covered therearound with less adhesive black film, tape, and paper, for instance, for light blocking purposes. In use, this covering is removed from the packaging case.

Thus, the encasing of an integrated type of information recording medium in the packaging case is very favorable for practically using media in product forms, because electrodes can be led out of the media in an assured yet simple manner while protection is given to the media.

Figure 11A:
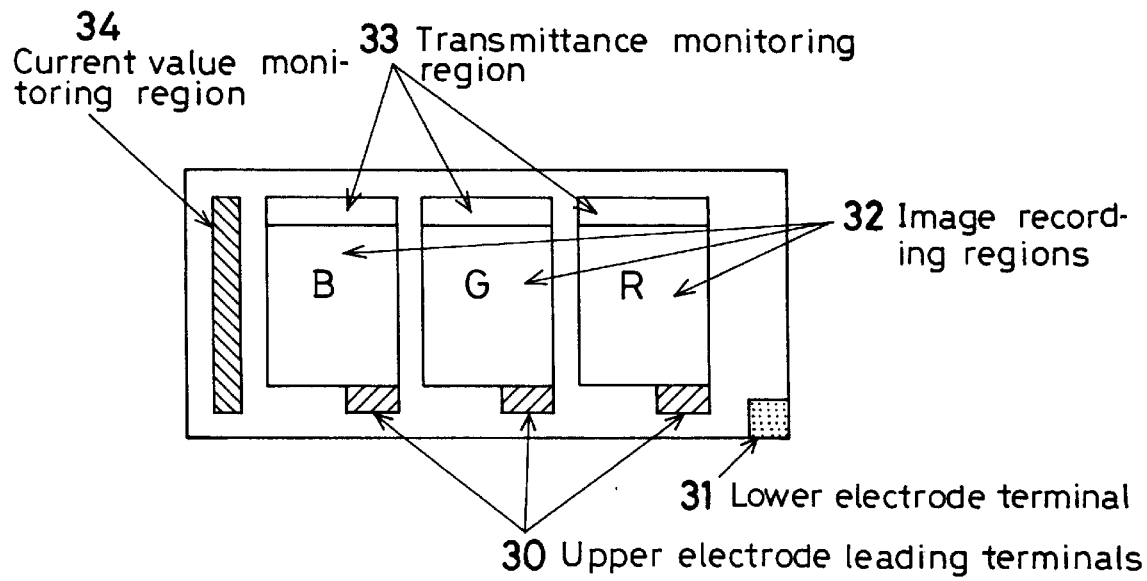
FIGS. 11A–11C illustrate another exemplary structure of the medium.
Figure 11B:
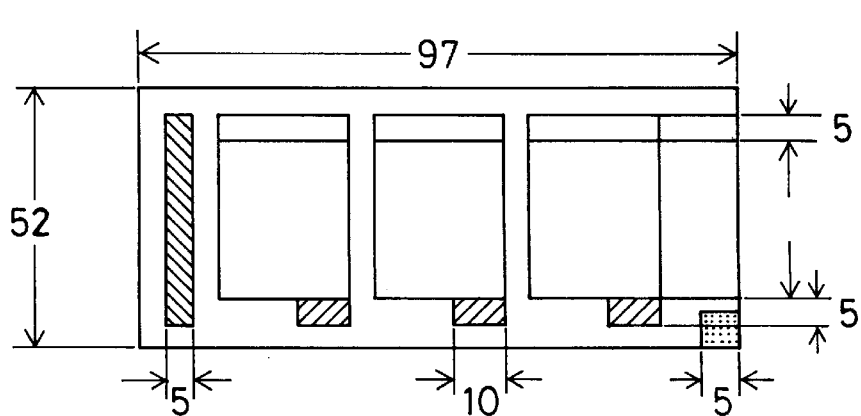
Figure 11C:

FIGS. 11A–11C show plan schematics for illustrating another embodiment of leading electrodes out of an integrated type of recording medium according to the present invention.

This embodiment is basically identical with that explained with reference to FIG. 3 with the exception that, as shown in FIG. 11A, transmittance monitoring regions 33 are defined by parts of R, G and B electrode regions, which are not opposite to upper electrode leading terminals 30.

FIG. 11B illustrates exemplary sizes of the respective regions of the integrated type of recording medium. Given a 52 mm×97 mm medium, the widths of the regions on the electrode leading side are 5 mm for the current value monitoring region, 10 mm for the upper electrode leading regions, and 5 mm for the lower electrode leading region.

FIG. 11C shows a side view of FIG. 11B.

Figure 12:
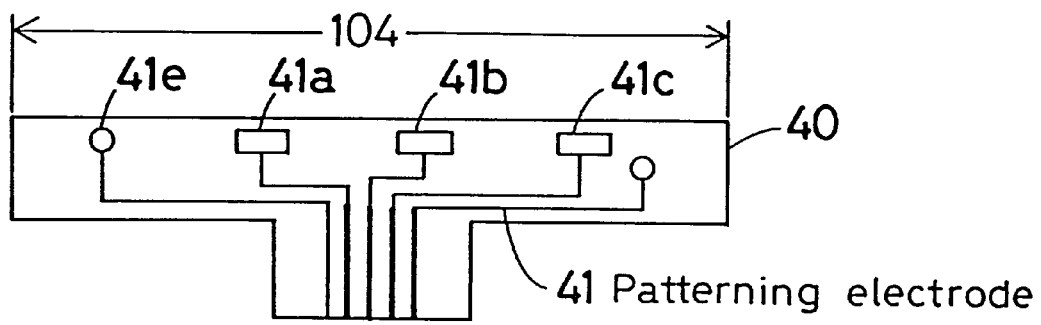
FIG. 12 is a schematic illustrating one embodiment of the printed board according to the present invention.

FIG. 12 illustrates one embodiment of a printed board designed to lead electrodes out of the respective regions shown in FIG. 11.

A flexible printed board 40 has a patterning electrode 41 printed thereon. Reference numerals 41*a* to 41*c* of the patterning electrode 41 are contact portions to be connected to upper electrode leading terminals 30 for R, G and B, 41*d* a contact portion to be connected to a lower electrode terminal 31, and 41*e* a contact portion to be connected to a current value monitoring region 34. Patterned interconnections are then bundled up on the front side of the board so that they can be connected to externals through an electrode leading port formed in the front side of a packaging case to be described later.

Figure 13:
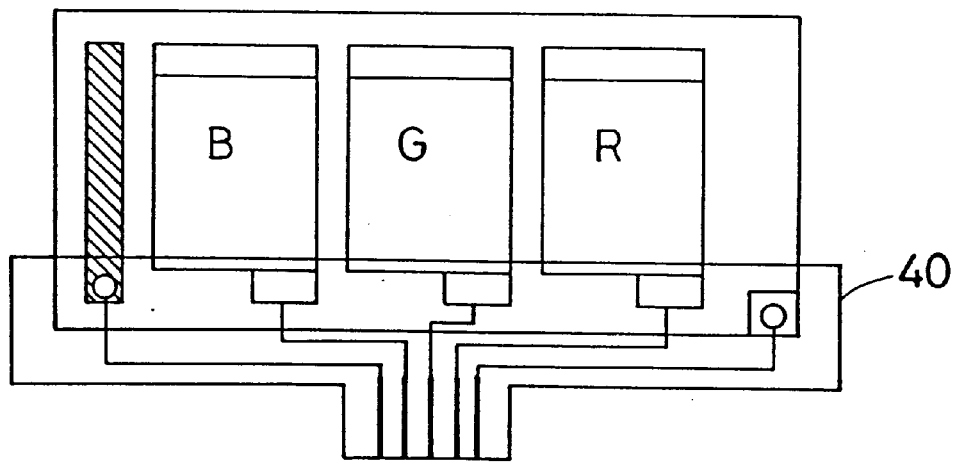
FIG. 13 is a schematic illustrating an exemplary connection of the patterning electrode to the medium.

FIG. 13 illustrates one exemplary connection of the patterning electrode of the printed board shown in FIG. 12 to leading electrodes of an integrated type medium.

The flexible printed board 40 with the patterning electrode formed on it is superposed on electrode leading regions of the integrated type medium with its respective contact portions turned upside down. The respective contact portions are then connected to the respective leading electrodes of the integrated type medium so that the electrodes can be led out of the front side thereof.

Figure 14:
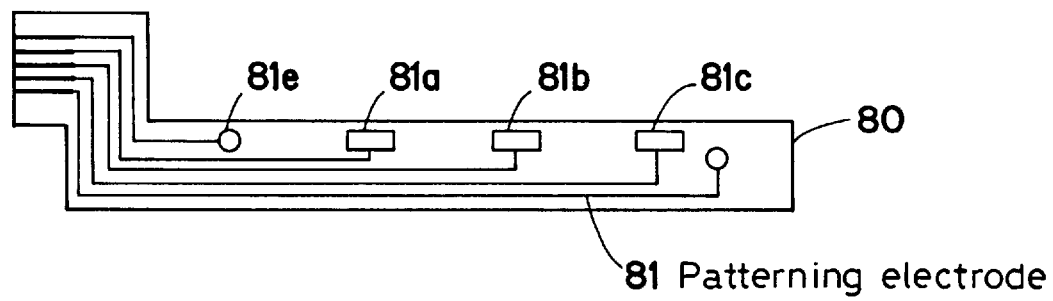
FIG. 14 is a schematic illustrating another embodiment of the printed board according to the present invention.

FIG. 14 illustrates another embodiment of the printed board designed to lead electrodes out of the respective regions shown in FIG. 11.

A flexible printed board 80 has a patterning electrode 51 printed thereon. Reference numerals 81*a* to 81*c* of the patterning electrode 81 represent contact portions to be connected to upper electrode leading terminals 30 for R, G and B, 81*d* a contact portion to be connected to a lower electrode terminal 31, and 81*e* a contact portion to be connected to a current value monitoring region 34.

The flexible printed board 80 in this embodiment is similar to the flexible printed board 40 shown in FIG. 12 with the exception that patterned interconnections are bundled up on one side via the current value monitoring region 34 for connection to externals through an electrode leading port formed in one side of a packaging case to be described later.

Figure 15:
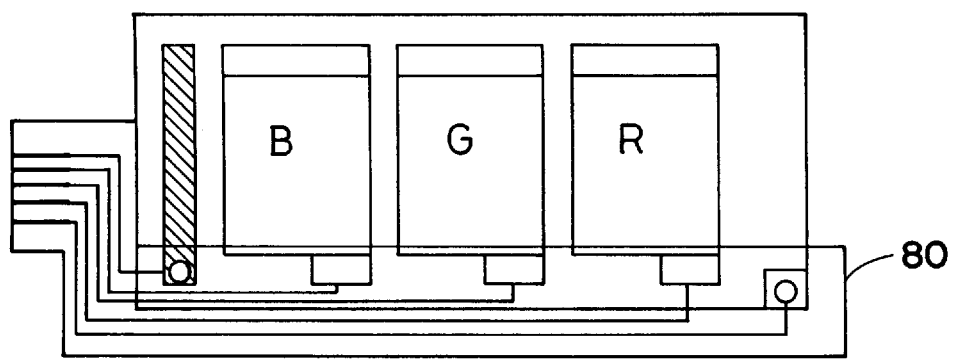
FIG. 15 is a schematic illustrating an exemplary connection of the patterning electrode to the medium.

FIG. 15 illustrates one exemplary connection of the patterning electrode shown in FIG. 14 to leading electrodes of an integrated type medium.

The flexible printed board 50 with the patterning electrode formed on it is superposed on leading electrode regions of the integrated type medium with its respective contact portions turned upside down. The respective contact portions are then connected to the respective leading electrodes of the integrated type medium so that the electrodes can be led out of one side thereof.

An account will now be given of a packaging case designed for leading electrodes out of an integrated type of information recording medium.

Figure 16A:
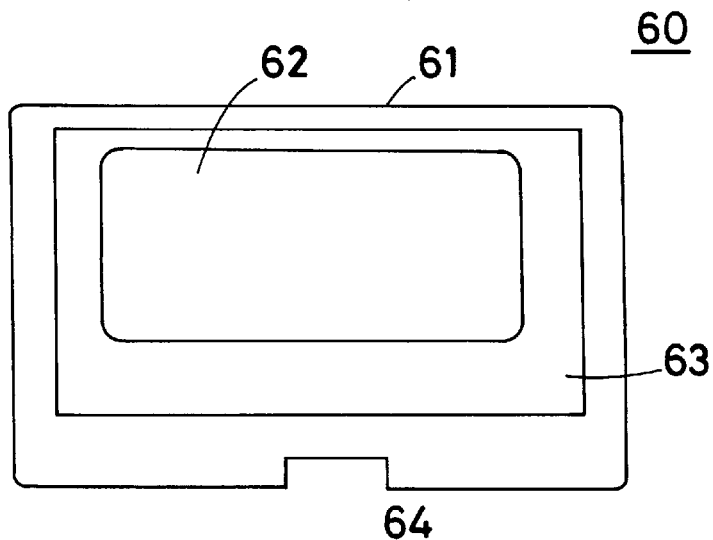
FIGS. 16A–16D illustrate one embodiment of the packaging case.
Figure 16B:
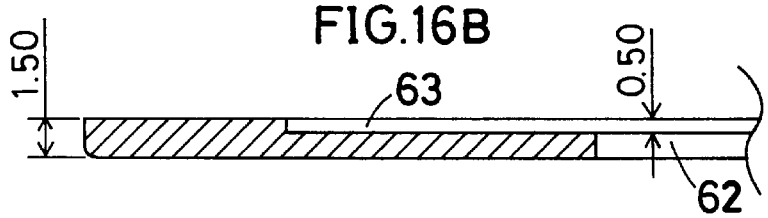
Figure 16C:
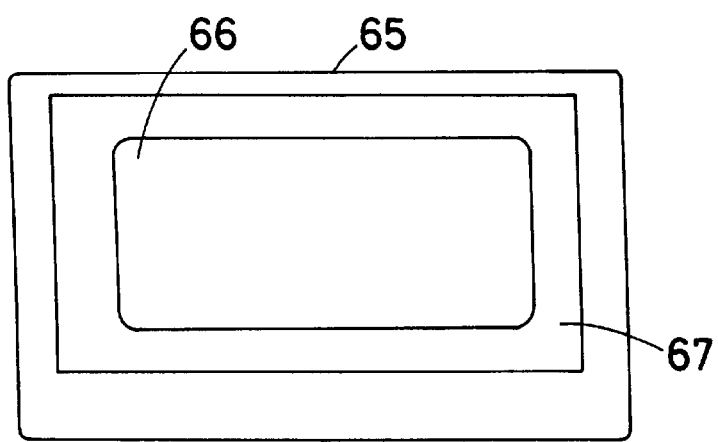
Figure 16D:
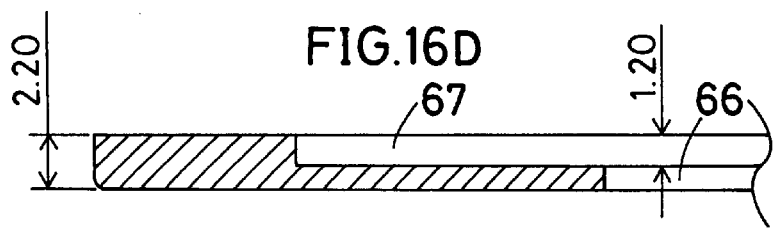

FIGS. 16A–16D illustrate still yet another embodiment of the packaging case according to the present invention; FIGS. 16A and 16B show an upper lid while FIGS. 16C and 16D show a lower lid. A packaging case 60 comprises upper and lower lids 61 and 65, each formed of ABS resin that has a low degree of heat shrinkage so that it can be easily injection molded, is light in weight, and is black in color o that the effect on blocking light can be enhanced. The upper lid 61 (opposing to a liquid crystal medium) is provided with one window 62 for making sure of R, G and B image formation regions, and a transmittance monitoring region. In an area of the upper lid member adjacent to and surrounding this window there is provided a depression of 0.5 mm in depth (shown by 63 in FIG. 16B), over which rubber is applied to keep the periphery of an integrated type medium in place.

The upper lid is further provided with an electrode leading port 64 in a front side thereof.

As can be seen from FIGS. 16C and 16D, the lower lid 65 (opposing to a photoelectric sensor), too, is provided with one window 66 for the R, G and B image formation regions. In an area of the lower lid member adjacent to and surrounding this window there is provided with a depression 67 of 1.20 mm in depth, into which the integrated type medium of 1.1 mm in thickness is fitted so that it can be held in place by the aforesaid holding rubber.

The upper and lower lids 61 and 65 with the integrated type medium sandwiched between them may be fixed together by means of screws, ultrasonic bonding, and so on.

Figure 17:
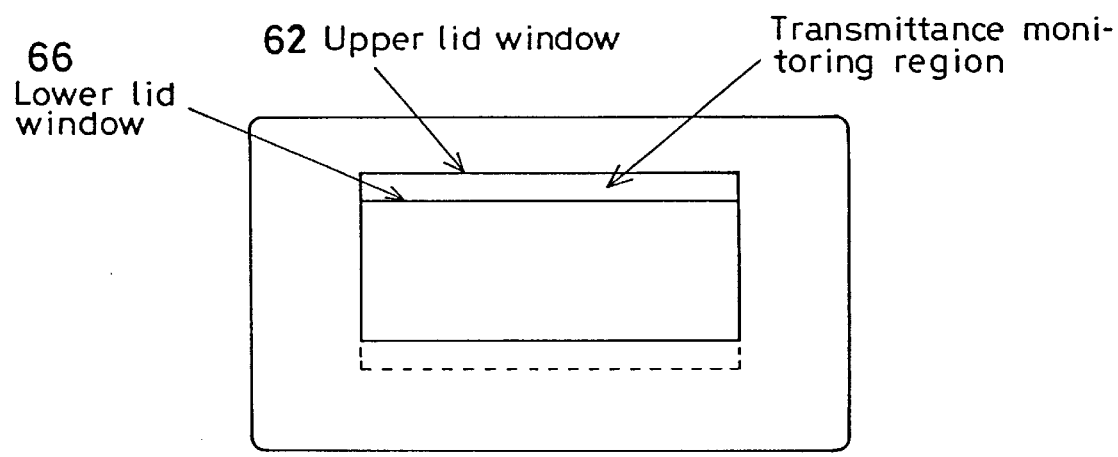
FIG. 17 is a schematic illustrating the relationship between the windows for image formation regions in the upper and lower lids.

It is here to be noted that as shown in FIG. 17, the upper and lower lids 61 and 66 are displaced to each other to make sure of the transmittance monitoring region by the upper lid. However, both the windows may be in coincidence with each other in terms of position and size.

Figure 18A:
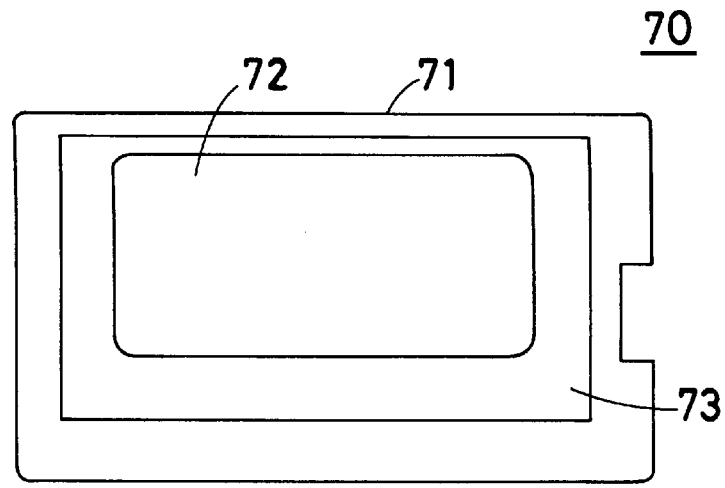
FIGS. 18A–18D illustrate another embodiment of the packaging case.
Figure 18B:
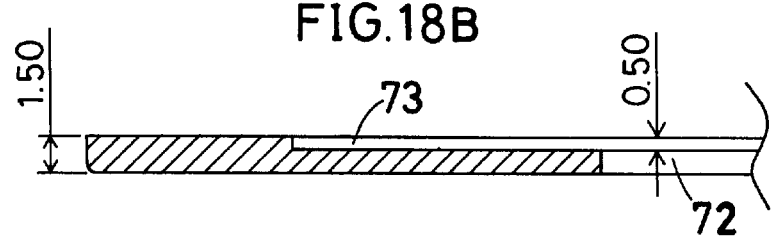
Figure 18C:
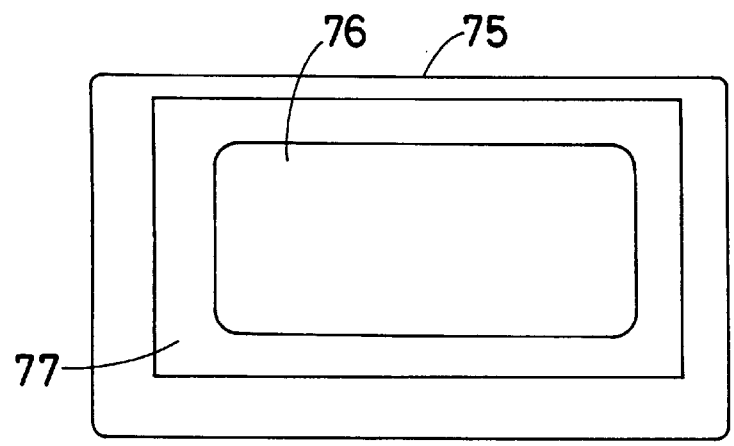
Figure 18D:
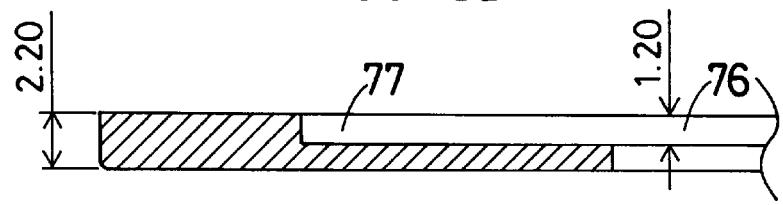

FIGS. 18A–18D illustrates still yet another embodiment of the packaging case according to the present invention; FIGS. 18A and 18B show an upper lid while FIGS. 18C and 18D show a lower lid. A packaging case 70 comprises upper and lower lids 71 and 75, each formed of ABS resin that has a low degree of heat shrinkage so that it can be easily injection molded, is light in weight, and is black in color so that the effect on blocking light can be enhanced. The upper lid 71 (opposing to a liquid crystal medium) is provided with one window 72 for making sure of R, G and B image formation regions, and a transmittance monitoring region. In an area of the upper lid member adjacent to and surrounding this window there is provided a depression of 0.5 mm in depth (shown by 73 in FIG. 18B), over which rubber is applied to keep the periphery of an integrated type medium in place. The upper lid is further provided with an electrode leading port 74 in a lateral side thereof.

As can be seen from FIGS. 18C and 18D, the lower lid 75 (opposing to a photoelectric sensor), too, is provided with one window 76 for the R, G and B image formation regions. In an area of the lower lid member adjacent to and surrounding this window there is provided with a depression 77 of 1.20 mm in depth, into which the integrated type medium is fitted so that it can be kept in place by the aforesaid holding rubber.

The upper and lower lids 71 and 75 with the integrated type medium sandwiched between them may be fixed together by means of screws, ultrasonic bonding, and so on.

Figure 19:
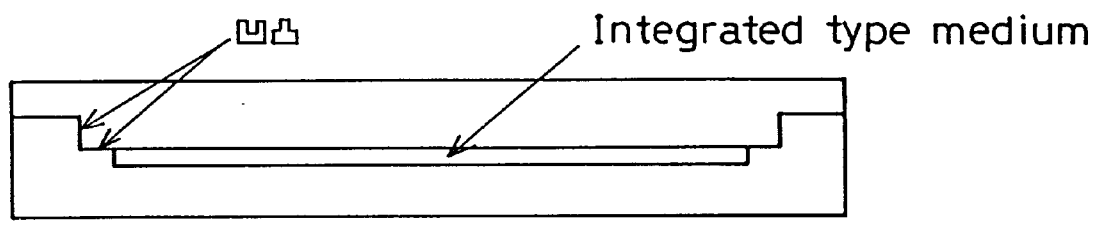
FIG. 19 is a schematic illustrating yet another embodiment of the packaging case.

In one modification of the packaging case shown in FIG. 18, there is provided a mechanism that allows ends of the upper and lower lids to be engaged with each other in female-male relationship, as shown in FIG. 19. Both the lids are engaged with each other by means of such an engaging mechanism, and then fixed together by means of screws or ultrasonic bonding, so that they can be easily engaged with an increased strength.

Figure 20:
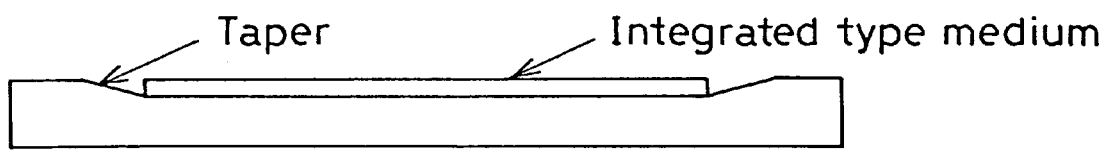
FIG. 20 is a schematic illustrating still yet another embodiment of the packaging case.

FIG. 20 illustrates another modification of the packaging case shown in FIG. 18, wherein the lower lid is tapered at both its ends to make easy the encasing of an integrated type medium in the packaging case. The tapered portions act as an integrated type medium-encasing mechanism, which allows the medium to move to a given position along the tapers with the application of slight force, and so dispenses with any precise alignment. It is thus possible to make fabrication easy, and precise alignment feasible.

Thus, mass production can be achieved by injection molding or the like, because easy leading of electrodes out of the medium is assured while protection is given to the medium, and because the case is structurally simplified by use of ABS resin.

Figure 21:
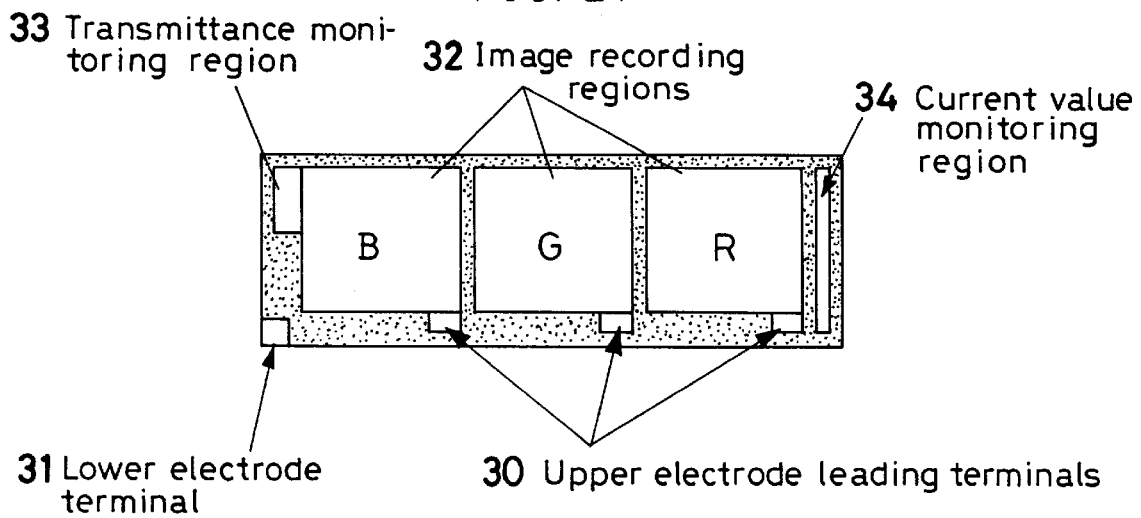
FIG. 21 is a schematic illustrating yet another structure of the medium.

FIG. 21 is a plan schematic illustrating yet another embodiment of leading electrodes out of an integrated type of information recording medium according to the present invention.

Referring to FIG. 21, upper electrode leading terminals 30 are connected to R, G and B electrodes of a liquid crystal recording medium for instance, and a lower electrode terminal 31 is connected to an electrode of a photoelectric sensor. Transmittance monitoring regions 33 are leading electrode regions connected to the respective R, G and B electrodes to monitor the transmittance of dark portions. The recording medium is provided at one end with a current value monitoring region 34 to monitor a (dark) current through a dark portion. These upper electrode leading terminals 30, lower electrode terminal 31, transmittance monitoring regions 33 and current value monitoring region 34 are then positioned such that electrodes can be led out of the same side (as shown).

Figure 22:
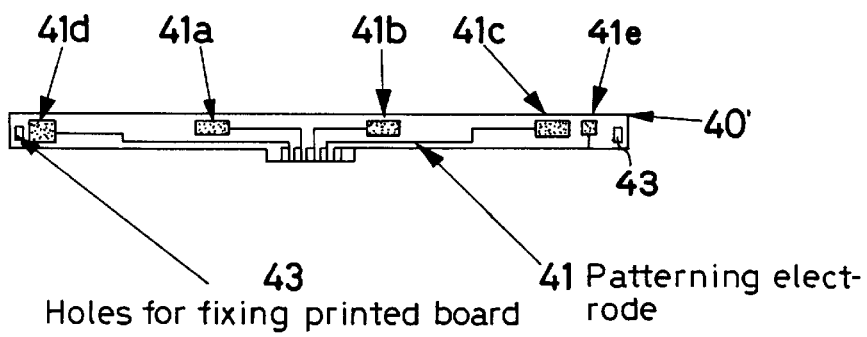
FIG. 22 is a schematic illustrating the patterning electrode.

FIG. 22 is a schematic showing a printed board for leading electrodes out of the respective regions shown in FIG. 21.

A flexible printed board 40' is printed thereon with a patterning electrode 41. Reference numerals 41*a* to 41*c* of the patterning electrode 41 represent contact portions connected to the upper electrode leading terminals 30 for R, G and B, 41*d* a contact portion connected to the lower electrode terminal 31, and 41*e* a contact portion connected to the current value monitoring region 34. It is here to be noted that the upper electrode leading terminals 30, because of being integral with the R, G and B electrodes, serve as the point of contact for terminals 41*a* to 41*c*. The printed board has also holes 43 therein so that it can be fixed to the case.

Figure 23:
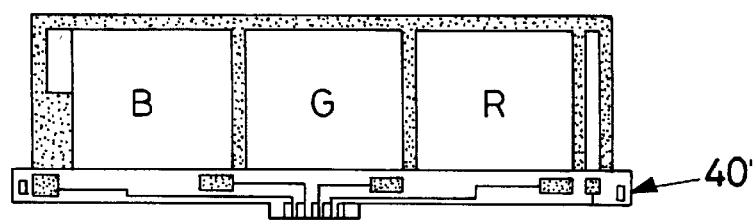
FIG. 23 is a schematic illustrating an exemplary connection of the patterning electrode to the medium.

FIG. 23 illustrates one exemplary connection of the patterning electrode shown in FIG. 22 to leading electrodes of an integrated type medium.

The flexible printed board 40' with the patterning electrode formed on it is stacked on leading electrode regions of the integrated type medium with its respective contact portions turned upside down. The respective contact portions are then connected to the respective leading electrodes of the integrated type medium.

A packaging case for leading electrodes out of an integrated type of information recording medium in this way will now be explained.

Figure 24:
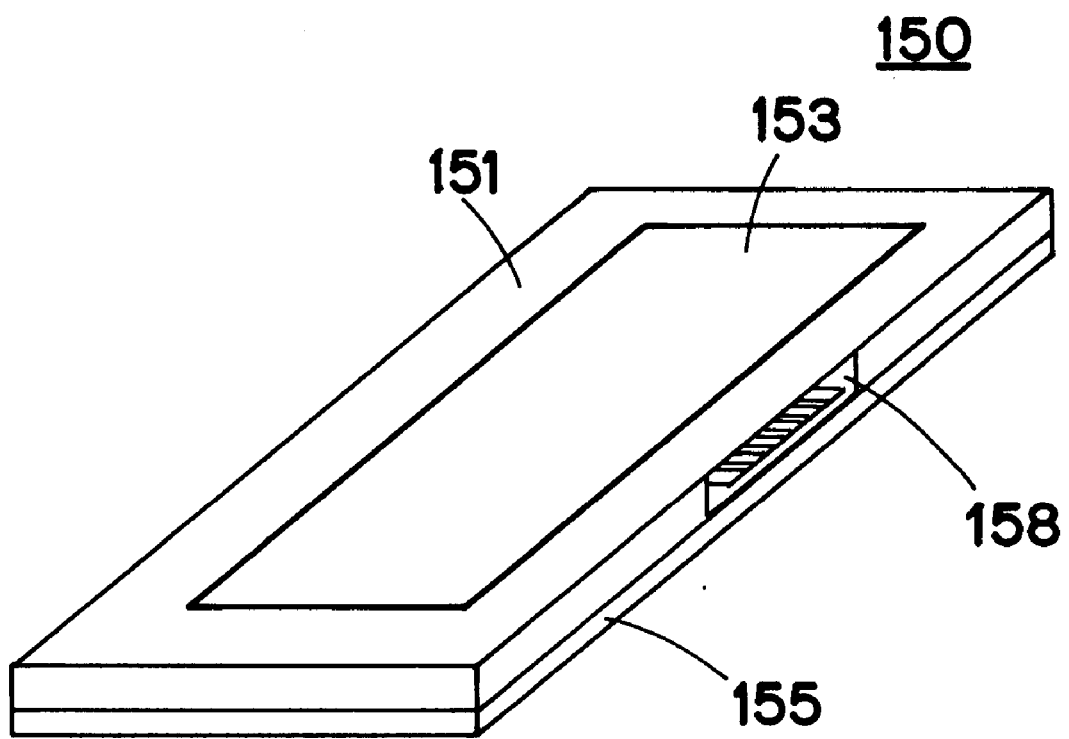
FIG. 24 is a schematic illustrating the packaging case.

FIG. 24 illustrates still yet another embodiment of the packaging case according to the present invention. A plastic packaging case 150 comprises an upper lid 151 (opposing to a liquid crystal medium) and a bottom lid 155 (opposing to a photoelectric sensor), and is provided with a window 153, and a patterning electrode leading port 158 in a front side thereof, out of which interconnections are led. Exposure of an image to light is then conducted from below to record it in the recording medium.

Figure 25:
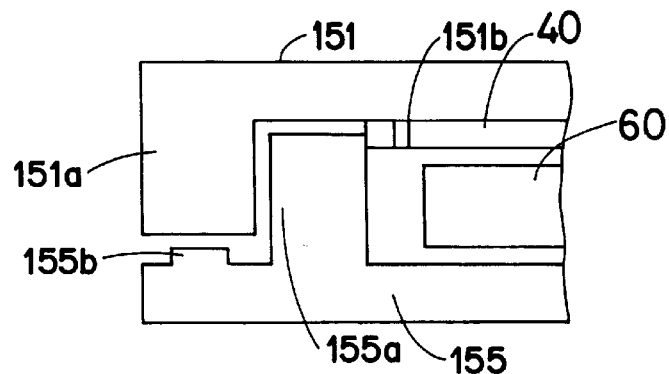
FIG. 25 is a detailed section illustrating an edge of the packaging case.
Figure 26:
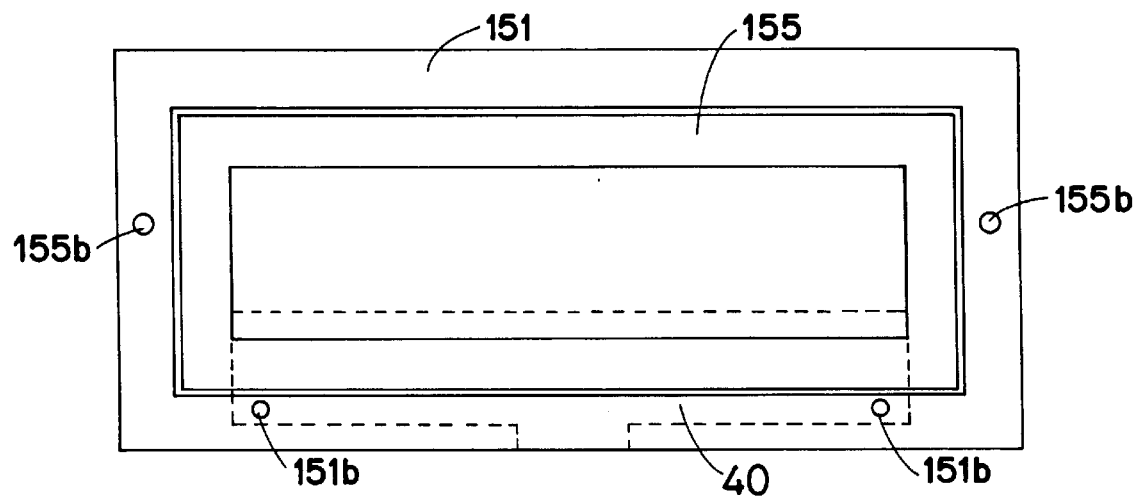
FIG. 26 is a plan schematic of the packaging case.

FIGS. 25 and 26 are an enlarged section of an edge part of the aforesaid packaging case and a plan schematic of the aforesaid packaging case, respectively.

As can be seen from FIG. 25 showing a section of a part of the case, a rectangular edge 151*a* of the upper lid 151 has some thickness. The bottom lid 155 is provided on a lateral edge with a fusing projection 155*b* at a position opposing to the edge 151*a* of the upper lid 151, and with an extension 155*b* at a position opposing to the inside of the edge 151*a* of the upper lid 151, so that they are fixedly engaged with each other against misalignment which may otherwise occur by vibration. The fusing projection 155*b* fuses upon irradiation with ultrasonic waves, thereby fixing the upper and bottom lids together. A flexible printed board 40 designed to lead electrodes out of an integrated type of recording medium 60 is provided through its periphery with holes through which the projections 151*b* of the upper lid 151 are to be inserted, so that it can be fixed to the upper lid 151 by inserting the projections 151*b* thereinto.

Thus, the upper lid is provided with projections for fixing the flexible printed board designed to lead electrodes out of an integrated type of recording medium and, at the same time, the portions of the upper and bottom lids to be engaged with each other are defined by a mating structure. When the integrated type of recording medium is subjected to ultrasonic fusion while it is sandwiched between the upper and bottom lids, therefore, the ultrasonic fusion is easily achievable without displacement of electrode positions of the flexible printed board and misalignment between the upper and bottom lids.

Figure 27:
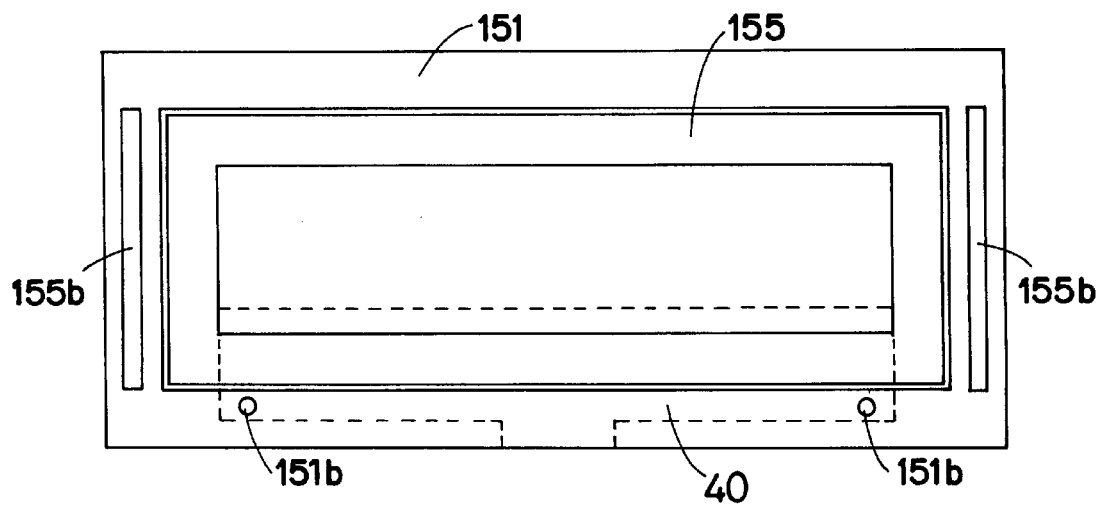
FIG. 27 is a plan schematic illustrating still yet another embodiment of the packaging case.

It should be noted that the present invention is in no sense limited to the arrangements shown in FIGS. 25 and 26. For instance, the fusing projection 155*b* may be provided all over four sides or a part thereof. Alternatively, a linear form of projection may be used as the fusing projection, as shown in FIG. 27. Also, the fusing projection may be provided on either the bottom lid or the upper lid. For the portions of the lids to be engaged with each other, the upper lid may define the inside and the bottom side the outside. Thus, various modifications may be possible.

When the integrated type of recording medium is subjected to ultrasonic fusion while it is sandwiched between the upper and bottom lids, the ultrasonic fusion is easily achievable without displacement of electrode positions of the flexible printed board and misalignment between the upper and bottom lids, so that the information recording medium can be easily incorporated in the case without displacement so that electrodes can be surely led out of the information recording medium. Thus, the information recording medium is suitable for mounting on cameras, etc.

What we claim is:

1. An integrated type of information recording medium comprising:

a liquid crystal recording medium having a composite liquid crystal/polymer layer stacked on a first electrode layer and first leading electrodes;

a photoelectric sensor having a second electrode layer and a photoconductive layer stacked on a transparent support and second leading electrodes;

wherein said liquid crystal recording medium and said photoelectric sensor are combined to form a stack so that said photoconductive layer and said liquid crystal recording medium are proximate or separated by only an intermediate layer;

wherein said first leading electrodes and said second leading electrodes are formed on the same side and same edge of said stack;

a flexible printed board having an interconnecting pattern and having third electrodes corresponding to said first leading electrodes and said second leading electrodes superposed on and in pressure contact with said first leading electrodes and said second leading electrodes so as to provide an electrode leading port.

2. The integrated type of information recording medium according to claim 1:

wherein said third electrodes and said interconnecting pattern are formed on opposite surfaces of said flexible printed board.

3. The integrated type of information recording medium according to claim 2:

wherein said third electrodes are each provided with several bump heads.

4. The integrated type of information recording medium according to claim 1:

wherein said flexible printed board is formed with holes adapted for fixing to a case.

* * * * *